(12) United States Patent
Zhang et al.

(10) Patent No.: US 6,958,303 B2
(45) Date of Patent: Oct. 25, 2005

(54) ELECTRO-STATIC DISSIPATIVE CERAMIC PRODUCTS AND METHODS

(75) Inventors: Jian Guo Zhang, Singapore (SG); Hwey Eng Liow, Singapore (SG); Bo Zhang, Sinagpore (SG)

(73) Assignee: Dou Yee Technologies Pte Ltd., Singapore (SG)

( * ) Notice: Subject to any disclaimer, the term of this patent is extended or adjusted under 35 U.S.C. 154(b) by 1 day.

(21) Appl. No.: 10/448,755

(22) Filed: May 30, 2003

(65) Prior Publication Data

US 2004/0242401 A1 Dec. 2, 2004

(51) Int. Cl.$^7$ .......................... C04B 35/119; H01B 1/08
(52) U.S. Cl. ................ 501/105; 252/520.2; 252/520.21
(58) Field of Search .................. 501/102, 103, 501/104, 105; 252/520.2, 520.21

(56) References Cited

U.S. PATENT DOCUMENTS

| | | | |
|---|---|---|---|
| 4,110,260 A | | 8/1978 | Yamamoto et al. |
| 4,866,016 A | | 9/1989 | Ando et al. |
| 4,931,214 A | | 6/1990 | Worrell et al. |
| 5,019,537 A | * | 5/1991 | Kato et al. ............. 501/1 |
| 5,087,594 A | * | 2/1992 | Kato et al. ............. 501/97.1 |
| 5,147,833 A | * | 9/1992 | Manning et al. ........ 501/105 |
| 5,409,968 A | | 4/1995 | Clatanoff et al. |
| 5,525,135 A | * | 6/1996 | Moltgen et al. ............. 51/309 |
| 5,830,819 A | | 11/1998 | Shikata et al. |
| 6,136,232 A | | 10/2000 | Burlingame |
| 6,354,479 B1 | | 3/2002 | Reiber et al. |
| 6,669,871 B2 | * | 12/2003 | Kwon et al. ............. 252/520.21 |

FOREIGN PATENT DOCUMENTS

WO 2004/049402 * 10/2004

* cited by examiner

*Primary Examiner*—Karl Group
(74) *Attorney, Agent, or Firm*—Law Offices of Albert Wai-Kit Chan, LLC

(57) ABSTRACT

The invention provides partially stabilised zirconia and alumina based electro-static dissipative or ESD ceramic compositions. The proposed ceramic compositions include specific amounts of dopants comprising one or more metal oxides selected from iron oxide, chromium oxide and titanium oxide. The proposed ESD ceramic materials are made into useful industrial products by injection moulding and sintering technology. A novel binder system may optionally be used to make injection mouldable feedstock. Useful products produced by the invention include, for example, ESD ceramic tweezers tips, ESD ceramic dispensing needles, ESD ceramic scissors and blades and ESD ceramic wire bonding capillaries which retain their ESD properties at relatively low temperatures, for example, service temperatures from 25 to 500° C.

16 Claims, No Drawings

ELECTRO-STATIC DISSIPATIVE CERAMIC PRODUCTS AND METHODS

FIELD OF THE INVENTION

The invention pertains to low resistivity or semiconductive ceramic materials, methods of making them and their applications. Specifically, the invention relates to new ceramic materials in which the electrical surface resistivity is controlled to be within a range that allows for the fabrication of useful articles that absorb and dissipate electro-static charges. Such articles include injection moulded and sintered electro-static dissipative (ESD) and/or antistatic tools, such as tweezers, scissors, dispensing needles and wire bonding capillaries.

BACKGROUND OF THE INVENTION

Currently on the market ESD products are dominantly those made of ESD plastic materials. These are basically polymer based composite materials with conductive fillers such as carbon and/or metal powders or fibres at various amounts, generally around 20–30 wt %, depending on the required conductivity and density of the fillers. Polymer based composites are generally injection moulded to form specific parts or products. U.S. Pat. No. 5,409,968 illustrates such a material used as an ESD material. This group of plastic composite materials has limited applications owing to its limited intrinsic mechanical performance, heat resistance and chemical resistance.

Efforts have been reported over the past twenty years with regards to the development of functional ceramic materials and ESD ceramic materials. It is known that by adding conductive materials it is possible to make a ceramic based ESD composite. U.S. Pat. No. 4,866,016 depicts aluminium oxide, titanium oxide and tin oxide composite based ceramics with additives of tantalum oxide, forming a useful dielectric material. U.S. Pat. No. 5,830,819 reports an alumina based ceramic sintered product, with additions of multiple oxides including manganese oxide, iron oxide and niobium oxide, having ESD and antistatic properties, with volume resistivity varying from $1 \times 10^7$ to $1 \times 10^{13}$ ohm-cm and an absolute value of the temperature coefficient of volume resistivity of not larger than 1.8%/degree C. at 25 to 75° C. More recently, U.S. Pat. No. 6,136,232 describes an ESD ceramic material comprising stabilised zirconia with additions of lanthanum chromate. These inventions provide materials with limited performance particularly at lower temperatures, and complicated compositions. They are difficult to make and process, with certain additives being cost prohibitive and toxic in practical commercial applications. The prior art also presents U.S. Pat. No. 4,110,260. That patent teaches electroconductive composite ceramics composed of an independent phase of conglomerates having a specific particle diameter of at lease $20\mu$ and also 2–50% by weight of a continuous phase of an electroconductive substance. The present invention does not rely on the addition of any electroconductive substance or electroconductive phase. U.S. Pat. No. 4,931,214 shows ceramic bodies with electronic conductivity for use in oxygen concentration cells, oxygen probes, fuel cells and electrolysis cells. Unlike the present invention, that patent teaches nothing about ESD bonding capillaries, tweezers or anti-static tools and the like and also relies on relatively exotic dopant oxides of metals from Groups Va and VIa of the Periodic System of Elements. U.S. Pat. No. 6,354,479 teaches the fabrication of capillary bonding tips in broad terms but fails to teach either the specific compositions or the specific heat treatment steps or fabrication steps which are disclosed in this specification. In addition, that patent teaches elaborate machining and manufacturing processes which are obviated by the techniques taught in this disclosure.

In the prior art, the electro-conductivity or electro-static dissipativeness of the composite is obtained through the connectivity of the second phase within the base matrix, where the base material is insulative and the second phase is usually a conductive material. By adjusting the appropriate volume percentage of the second phase fillers, the composite can be made electro-conductive or ESD or antistatic. Because the material is a composite, non-uniform dispersions and/or agglomerations of the second phases render so-called hot-spots in the material, which are undesirable for ESD applications.

OBJECTS AND SUMMARY OF THE INVENTION

It is an object of the present invention to provide simple ESD ceramic material compositions and processes for manufacturing them, which compositions can be used at temperatures from 25 to 500° C. without degradation of their required properties.

It is another object of the present invention to provide a novel and specific binder system, for use with the above referenced compositions, which enable the ESD ceramic materials to be made into products using injection moulding and sintering.

Accordingly, the present invention provides that all raw materials are ceramic powders and they are insulative at the beginning of the process. There are no conductive phases or materials added to the insulative base ceramic materials. The electro-static dissipative properties are obtained through the interaction of the base and added oxides under the controlled process conditions, creating an oxygen deficiency within the matrix. This results in the second phase being totally "dissolved" in the base material, producing a new non-stoichiometric compound, which has metallic interstitial atoms, which lead to n-type of electrical conductivity.

DETAILED DESCRIPTION OF THE INVENTION

Electrostatic discharge has a considerable destructive potential during the manufacturing of disc-drives, microelectronics, semiconductor devices and generally in the telecommunications device manufacturing industries. Control over electro-static discharge is of the utmost importance in these types of manufacturing operations. Manufacturers thus provide ESD wire bonding capillaries, tweezers, scissors, dispensing needles, pushing rods, and so on as means for controlling unintentional high voltage discharges. It will be understood that tools of this type are expected to be electrically dissipative, having rates of conductivity which are sufficient to prevent charge accumulation yet incapable of overloading the very devices being bonded or otherwise handled. In addition manufactured ESD tools and articles are often expected to be very stiff, wear resistant, clean and chemically inert.

The doping of ceramic compositions is seen in the prior art as a solution to the problem of manufacturing of ceramic articles with adequate conductivity, particularly at high temperatures such as 800–1000° C. In contrast, ESD ceramics are required not just to demonstrate conductivity, but controlled rates of conductivity, particularly at lower temperatures such as 25–500° C.

Having regard for the above referenced considerations, the disclosure of the present invention now teaches novel ESD ceramic materials and processes for their fabrication based on either or both partially stabilised zirconia and pure alumina. In some preferred embodiments, compositional economy and simplicity are attained by requiring just one addition of a metal oxide at 2–25 wt %. This allows for the first time, blending of readily available ceramic non-conductive powders together for application in injection moulding process technology. Binders and undesirable processing agents are then conveniently removed before sintering in air or in a reducing atmosphere and/or in a vacuum. When sintering is done in air, a favourable heat treatment follows. The instant disclosure provides a specific and novel binder system especially for the said ESD ceramic materials, enabling the successful production of the said products free from defects, without compromising their mechanical property requirements. It will be understood that while this binder is both new and useful, it is not absolutely essential to the practice or application of the invention.

In accordance with the present invention, and as shown in Table 1 there is provided partially stabilised zirconia based ESD ceramic compositions A and B, and pure alumina based ESD ceramic compositions C and D.

TABLE 1

Zirconia and alumina based ESD ceramic compositions

| Composition | Description | Zirconium oxide | Aluminium oxide | Metal oxide dopant |
|---|---|---|---|---|
| A (wt %) | Zirconia based | 80–98 | 0 | 2–20 |
| B (wt %) | Strengthened zirconia based | 70–85 | 5–25 | 10–25 |
| C (wt %) | Alumina based | 0 | 80–95 | 5–20 |
| D (wt %) | Toughened alumina based | 5–25 | 65–85 | 10–25 |

According to the first aspect of the present invention, a dopant oxide at a quantity of 2–25 wt % is admixed with a pure alumina, or a partially stabilised zirconia (stabilised with preferably 5.2 wt % of yttria), or a toughened alumina (toughened with 5–25 wt % partially stabilised zirconia), or a strengthened zirconia (strengthened with 5–25 wt % of pure alumina) producing alumina based ceramic ESD compositions and zirconia based ceramic ESD compositions. The zirconia based ESD ceramic compositions contain 80–98 wt % zirconia partially stabilised with preferably 5.2 wt % of yttria and 2–20 wt % of dopants. Said dopants consist of at least one (and preferably one) metal oxide selected from oxides including iron oxide, chromium oxide and titanium oxide. The strengthened zirconia based ESD ceramic compositions contain 70–85 wt % zirconia partially stabilised with preferably 5.2 wt % of yttria (strengthened with 5–25 wt % of pure alumina) and 10–25% by weight of dopants. Said dopants consist of at least one (and preferably one) metal oxide selected from oxides including iron oxide, chromium oxide and titanium oxide. The alumina based ESD ceramic compositions contain 80–95 wt % pure alumina (purity >99.95%) and 5–20% by weight of dopants. Said dopants consist of at least one (and preferably one) metal oxide selected from oxides including iron oxide, chromium oxide and titanium oxide. The toughened alumina based ESD ceramic compositions contain 65–85 wt % pure alumina (purity >99.95%, toughened with 5–25 wt % partially stabilised zirconia) and 10–25% by weight of dopants. Said dopants consist of at least one (and preferably one) metal oxide selected from oxides including iron oxide, chromium oxide and titanium oxide.

Further to another aspect of the present invention, the ESD ceramic compositions disclosed above are applied to injection moulding process by blending the dry powdered oxide ceramic ingredients with a novel (but non-essential) binder system. The preferred binder system comprises a composition of thermal degradable polymers, polyolefin, surfactants and waxes, specifically the said polymers are high density polyethylene (HDPE) and ethylene vinyl alcohol (EVA), in the range of 40–70 wt %. Said polyolefin includes peanut oil, vegetable oil, or fish oil, in the range of 0–10 wt %, more preferably 2–10 wt %. Said surfactant is stearic acid, in the range of 1–10 wt %, more preferably 1–5 wt %. The preferred waxes are polyethylene wax, paraffin wax, and bee wax and the like, in the range of 25–50 wt %. The ESD compositions and the binder components are mixed under heat and vacuum to produce injection mouldable feedstock.

The method for the invention proceeds generally as follows. The ESD ceramic materials are mixed sufficiently and uniformly using attrition mill. Thereafter, the mixed ESD ceramic materials are mixed with the binder system under vacuum of about $10^{-2}$ torr using a planetary kneading mixer. The feedstock produced is made into useful industrial products using injection moulding and sintering. The sintering is done in air or in a vacuum of about 1 to $10^{-2}$ torr or in a reducing atmosphere, heating to 1300 to 1600° C. and holding for 1 to 4 hours followed by controlled cooling down to below 1000° C. then followed by natural furnace cooling. In sintering in air, a heat treatment of about 1000° C. in hydrogen (reducing atmosphere) or in a vacuum of about 1 to $10^{-2}$ torr and holding for 1 to 3 hours before cooling down naturally also in a hydrogen reducing atmosphere or in a vacuum of about 1 to $10^{-2}$ torr to room temperature. In sintering in a vacuum or in a reducing atmosphere, the said after heat treatment is not required.

According to another aspect of the present invention, the said ESD ceramic materials are made into useful industrial products using powder injection moulding technology. The said products include ESD ceramic tweezers tips; ESD ceramic scissors blades; ESD ceramic dispensing needles and ESD ceramic wire bonding capillaries. The said ESD ceramic tweezers tips are made of 80–90 wt % of yttria partially stabilised zirconia and 10–20 wt % of titania (purity >99.9%), formed using injection moulding and sintering, ideally having electrical surface resistivity in the range of $3 \times 10^6$ to $8 \times 10^9$ ohm/square at 10V and 100V of applied voltages; static decay time of <1.0 s from +/−1000V to +/−10V and discharge current at 500V being <10 mA. The said ESD ceramic dispensing needles are made of 85–95 wt % of yttria partially stabilised zirconia and 5–15 wt % of titania (purity >99.9%), formed using injection moulding and sintering, having electrical surface resistivity in the range of $2 \times 10^7$ to $9 \times 10^9$ ohm/square at 10V and 100V of applied voltages. The said ESD ceramic scissors blades are made of 80–90 wt % of strengthened zirconia (strengthened with 5–20 wt % of pure alumina) and 10–20 wt % of titania (purity >99.9%), formed using injection moulding and sintering, having electrical surface resistivity in the range of $5 \times 10^6$ to $9 \times 10^9$ ohm/square at 10V and 100V of applied voltages. The said ESD ceramic wire bonding capillaries are made of 80–95 wt % of toughened alumina (purity >99.95%, toughened with 5–25 wt % of yttria partially stabilised zirconia) and 5–20 wt % of titania (purity >99.9%), formed using injection moulding and sintering and finishing, having electrical surface resistivity in the range of $6\times10^6$ to $8\times10^9$ ohm/square at 10V and 100V of applied voltages, which remains unchanged when subjecting to service temperatures from 25 to 500° C.

Unless defined otherwise all technical and scientific terms used herein have the same meaning as commonly understood to one of ordinary skill in the art to which this invention belongs.

The present invention is hereinafter described specifically by way of Examples. The following examples are put forth so as to provide those of ordinary skill in the art with a complete disclosure and description of how to make and use the present invention, and are not intended to limit the scope of what is regarded as the invention nor are they intended to represent that the experiments below are all and only experiments performed. Efforts have been made to ensure accuracy with respect to numbers used (e.g. amounts, temperature, etc.) but some experimental errors and deviations should be accounted for. Unless indicated otherwise, parts are parts by weight and temperature is in degrees Celsius.

EXAMPLES

Example 1

The partially stabilised zirconia (with 5.2 wt % yttria) and titania powders obtained commercially were weighed according to the weight ratios as defined in Table 2.

TABLE 2

Composition 1 - zirconia based ESD ceramic composition for Example 1

|  | zirconia | titania |
|---|---|---|
| Composition 1 | 80–90 wt % | 10–20 wt % |

The two powders are then admixed together with an attrition mill to achieve a uniform mixture, which is then mixed together with the novel binder system in the volume percentage of about 45–58%. The detailed binder compositions are defined as weight ratios as for example in Table 3.

TABLE 3

Binder System for Example 1

|  | HDPE | EVA | Oil | Wax | Stearic Acid |
|---|---|---|---|---|---|
| Weight % | 30–40 | 15–25 | 2–8 | 30–40 | 1–10 |

The mixing is performed under vacuum of about $10^{-2}$ torr using a planetary kneading mixer. The feedstock produced is applied to the manufacturing of the product via injection moulding and sintering. Said product is, for example, a tweezers tip and no machining is required. The said sintering is done in air or in a vacuum of 1 to $10^{-2}$ torr or in a reducing atmosphere, heating to 1350 to 1450° C. and holding for 2–4 hours followed by controlled cooling down to below 1000° C. then followed by natural furnace cooling. In sintering in air, a heat treatment is applied to the sintered product to transform the insulating off-white coloured ceramic to ESD black-greyish coloured product. The said heat treatment includes heating to 1000° C. in hydrogen (reducing atmosphere) and holding for 1 to 3 hours before cooling down naturally also in a hydrogen reducing atmosphere to room temperature. In sintering in a vacuum or in a reducing atmosphere, the said after treatment is not required. The electrical surface resistivity of this product is measured to be within $5\times10^7$ to $8\times10^8$ ohm/square. The static decay time is measured to be below 0.5 s from +/−1000V to +/−10V. And the discharge current at 500V is below 6 mA.

Example 2

In this example, the ESD material composition is especially formulated for a dispensing needle product. Table 4 shows the zirconia based ESD ceramic composition.

TABLE 4

Composition 2 - zirconia based ESD ceramic composition for Example 2

|  | zirconia | titania |
|---|---|---|
| Composition 2 | 85–95 wt % | 5–15 wt % |

The product is produced following the same process route as the product in Example 1. The electrical surface resistivity of this product is measured to be within $3\times10^8$ to $6\times10^9$ ohm/square at 10V and 100V of applied voltages.

Example 3

In this example, a strengthened zirconia based ESD ceramic composition is used for making scissor blades. The material composition is shown in Table 5.

TABLE 5

Composition 3 - strengthened zirconia based ESD ceramic composition for Example 3

|  | strengthened zirconia | titania |
|---|---|---|
| Composition 3 | 85–90 wt % | 10–15 wt % |

The product is produced following the same process route as the product in Example 1. The electrical surface resistivity of this product is measured to be within $3\times10^7$ to $6\times10^9$ ohm/square.

Example 4

In this example, a toughened alumina based ESD ceramic composition is formulated and applied to the manufacture of wire bonding capillaries. Table 6 details the ESD material composition.

TABLE 6

Composition 4 - toughened alumina based ESD ceramic composition for Example 4

|  | toughened alumina | titania |
|---|---|---|
| Composition 4 | 75–90 wt % | 10–25 wt % |

Again the powders are admixed together with an attrition miller. The novel binder system is modified to cater for easy binder removal thermally. Table 7 shows the detailed binder system.

TABLE 7

Binder System for Example 4

|  | HDPE | EVA | Oil | Wax | Stearic Acid |
|---|---|---|---|---|---|
| Weight % | 10–15 | 35–45 | 0–5 | 40–50 | 2–5 |

The sintering is done in air or in a vacuum of 1 to $10^{-2}$ torr or in a reducing atmosphere, heating to 1450 to 1600° C. and holding for 2–4 hours followed by controlled cooling down to below 1000° C. then followed by natural furnace cooling. In sintering in air, a heat treatment is applied to the sintered product to transform the insulating off-white coloured ceramic to ESD black-greyish coloured product. The said heat treatment includes heating to 1000° C. in hydrogen (reducing atmosphere) and holding for 1 to 3 hours before cooling down naturally also in a hydrogen reducing atmosphere to room temperature. In sintering in a vacuum or in a reducing atmosphere, the sintered product is black in colour and no hydrogen heat treatment is required. The electrical surface resistivity is $5 \times 10^7$ to $9 \times 10^8$ ohm/square at 10V and 100V of applied voltages and decay time is below 0.3 s, which remains unchanged when subjecting to service temperatures from 25 to 500° C.

Having now fully described this invention, it will be appreciated by those skilled in the art that the same can be performed within a wide range of equivalent parameters, concentrations, and conditions without departing from the spirit and scope of the invention and without undue experimentation. The invention also includes all of the steps, features, compositions and compounds referred to or indicated in this specification (unless specifically excluded) individually, collectively, and any and all combinations of any two or more of said steps or features.

While this invention has been described in connection with specific embodiments thereof, it will be understood that it is capable of further modifications. This application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. An ESD ceramic composition based on substantially pure alumina and dopant comprising 65–95 wt % substantially pure alumina (purity >99.95%) and 5–35% by weight of dopant, which comprises partially stabilised zirconia, with 5.2 wt % of yttria, and titanium oxide, wherein the dopant further comprises iron oxide.

2. An ESD ceramic composition based on substantially pure alumina and dopant comprising 65–95 wt % substantially pure alumina (purity >99.95%) and 5–35% by weight of dopant, which comprises partially stabilised zirconia, with 5.2 wt % of yttria, and titanium oxide, wherein the dopant further comprises chromium oxide.

3. An ESD ceramic composition based on substantially pure alumina and dopant comprising 65–95 wt % substantially pure alumina (purity >99.95%) and 5–35% by weight of dopant, which comprises partially stabilised zirconia, with 5.2 wt % of yttria, and titanium oxide, wherein the dopant further comprises iron oxide and chromium oxide.

4. The ESD ceramic composition of claim 1, further comprising a binder which comprises thermally degradable polymers, polyolefin, surfactants and waxes, wherein the polymers are high density polyethylene (HDPE) and ethylene vinyl alcohol (EVA), in the range of 40–70 wt %, the polyolefin comprising peanut oil, vegetable oil, or fish oil in the range of 2–10 wt %, the surfactant being stearic acid, in the range of 1–5 wt %, and the waxes selected from the group comprising polyethylene wax, paraffin wax, bee wax and the like in the range of 25–50 wt %.

5. The ESD ceramic composition of claim 2, further comprising a binder which comprises thermally degradable polymers, polyolefin, surfactants and waxes, wherein the polymers are high density polyethylene (HDPE) and ethylene vinyl alcohol (EVA), in the range of 40–70 wt %, the polyolefin comprising peanut oil, vegetable oil, or fish oil in the range of 2–10 wt %, the surfactant being stearic acid, in the range of 1–5 wt %, and the waxes selected from the group comprising polyethylene wax, paraffin wax, bee wax and the like in the range of 25–50 wt %.

6. The ESD ceramic composition of claim 3, further comprising a binder which comprises thermally degradable polymers, polyolefin, surfactants and waxes, wherein the polymers are high density polyethylene (HDPE) and ethylene vinyl alcohol (EVA), in the range of 40–70 wt %, the polyolefin comprising peanut oil, vegetable oil, or fish oil in the range of 2–10 wt %, the surfactant being stearic acid, in the range of 1–5 wt %, and the waxes selected from the group comprising polyethylene wax, paraffin wax, bee wax and the like in the range of 25–50 wt %.

7. An article comprising the ESD ceramic composition of claim 1.

8. An article comprising the ESD ceramic composition of claim 2.

9. An article comprising the ESD ceramic composition of claim 3.

10. An article comprising the ESD ceramic composition of claim 4.

11. An article comprising the ESD ceramic composition of claim 5.

12. An article comprising the ESD ceramic composition of claim 6.

13. An ESD ceramic composition based on substantially pure alumina and dopant comprising 65–85 wt % substantially pure alumina (purity >99.95%) and 5–25% by weight of dopant, which comprises partially stabilised zirconia, with 5.2 wt % of yttria, and 10–25 wt % of titanium oxide.

14. The ESD ceramic composition of claim 13, further comprising a binder which comprises thermally degradable polymers, polyolefin, surfactants and waxes, wherein the polymers are high density polyethylene (HDPE) and ethylene vinyl alcohol (EVA), in the range of 40–70 wt %, the polyolefin comprising peanut oil, vegetable oil, or fish oil in the range of 2–10 wt %, the surfactant being stearic acid, in the range of 1–5 wt %, and the waxes selected from the group comprising polyethylene wax, paraffin wax, bee wax and the like in the range of 25–50 wt %.

15. An article comprising the ESD ceramic composition of claim 13.

16. An article comprising the ESD ceramic composition of claim 14.

* * * * *